Patented Apr. 17, 1934

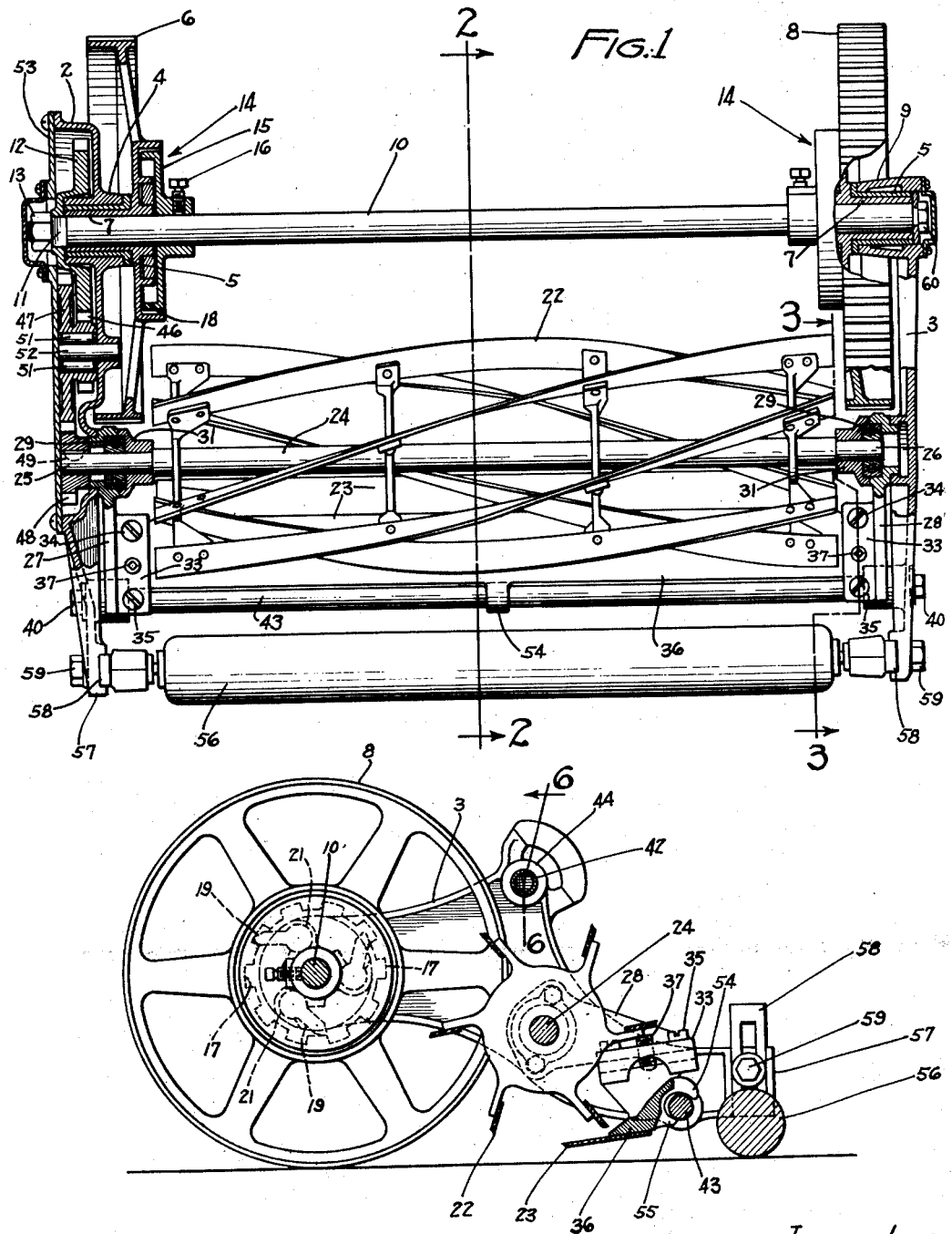

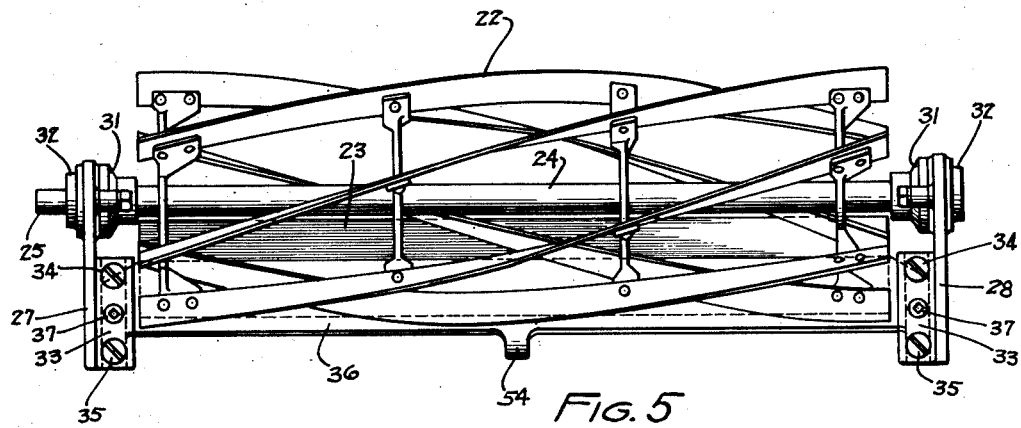
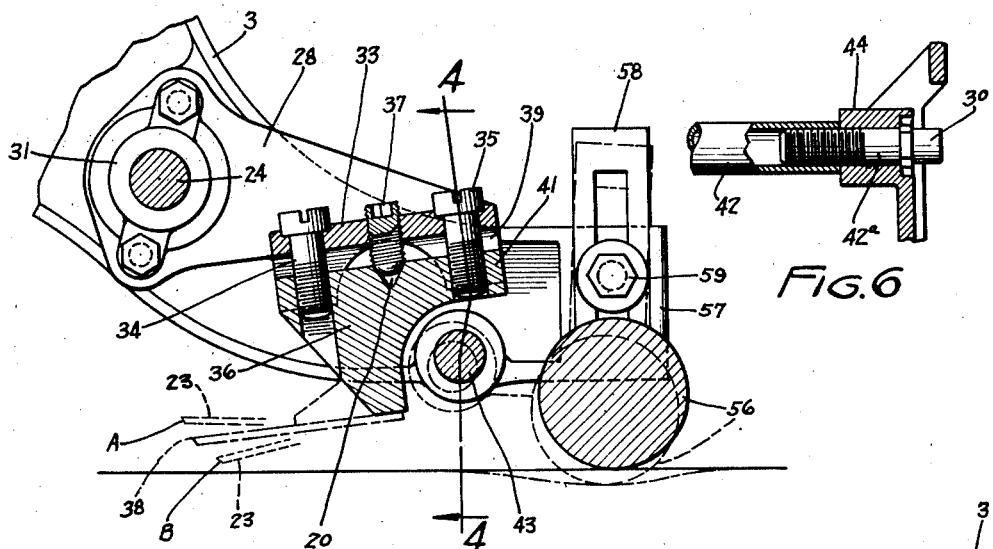
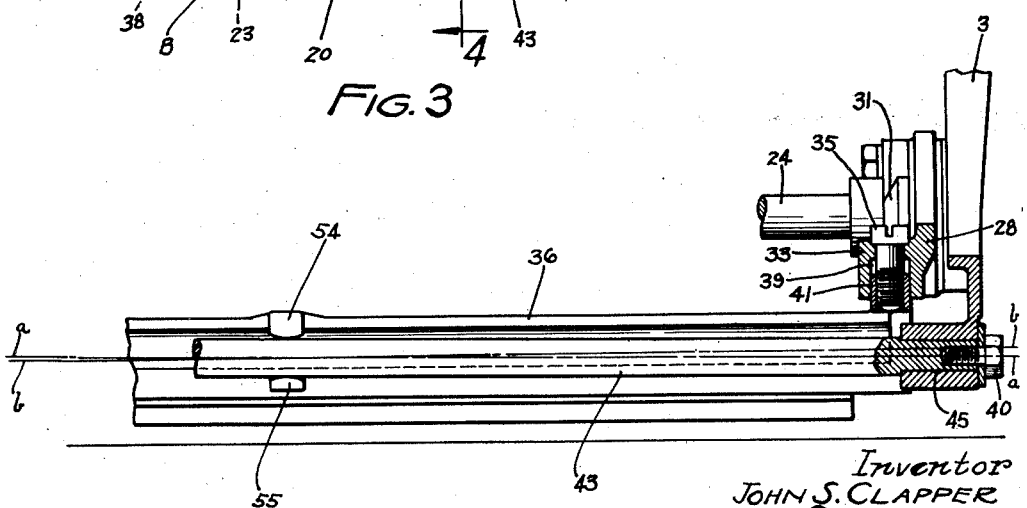

1,955,174

UNITED STATES PATENT OFFICE 1,955,174

LAWN MOWER

John S. Clapper, Minneapolis, Minn.

Application February 1, 1930, Serial No. 425,216

5 Claims. (Cl. 56—253)

This invention relates to improvements in lawn mowers and concerns itself more particularly with lawn mowers of the type provided with a cutting reel which co-operates with a horizontally disposed cutting blade to sever the blades of grass. In practice, the blades of the cutting reel should not clear the horizontal cutting blade more than one-thousandth of an inch if the lawn mower is to properly cut the grass. Blades of grass include in their structure fibers which are less than one-thousandth of an inch in diameter and in order to obtain proper cutting it is desirable in many instances to provide for a clearance of even less than one-thousandth of an inch between the cutting reel and the horizontally disposed cutting blade. Cutting reels are ordinarily driven at relatively high speed and for this reason it is essential that frictional contact between the reel and the cutting blade be avoided. Such contact results in a deterioration of the cutting edges and may actually damage the internal structure of the steel. Also, it requires the expenditure of an undue amount of power in order to effect the rotation of the reel. In hand operated lawn mowers it is particularly desirable to avoid a construction which can be operated only upon the expenditure of a relatively great amount of power. The universal object is to have the lawn mower operate easily and with a minimum expenditure of energy on the part of the operator.

Much difficulty has been experienced in properly maintaining the desired clearance between the cutting reel and the horizontally disposed cutting blade in the lawn mowers which have heretofore been commercially manufactured. Even though the proper clearance is effected while the lawn mower is not in operation, it has been found that this clearance will vary by appreciable amounts if not disappear entirely, during the course of operation. In the lawn mowers heretofore marketed, the cutting blades and cutting reels are rigidly mounted with respect to the main frame of the mower. In normal operation, stresses are set up in the main mower frame which result in deflections thereof and these deflections in turn cause the variations in clearance referred to above.

It is a general purpose of the present invention to provide a mower construction in which the cutting reel and horizontally disposed cutting blade are included in a rigid unit, which unit is flexibly mounted in the main frame of the mower in such a way as to prevent deflection thereof upon deflection of the main mower frame. That is to say, the rigid unit including the revolving cutting reel and horizontal cutting blade is so mounted with respect to the main frame that the latter can move relatively to the former without producing deflection of the former.

A more specific object of the invention is the provision of a rigid unit including a revolving reel and horizontal cutting blade as described above, which has incorporated therewith means for effecting a relative adjustment of the blade and cutting reel, independently of the main mower frame.

These and various other objects of the invention will become more readily apparent upon a detailed review of the accompanying drawings and specification together with the appended claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 1 is a plan view, partially in section, showing a lawn mower with the invention embodied in the construction thereof;

Figure 2 is a vertical sectional view on the line 2—2 of Figure 1;

Figure 3 is an enlarged detail sectional view on the line 3—3 of Figure 1;

Figure 4 is a detail sectional view on the line 4—4 of Figure 3;

Figure 5 is a view illustrating the reel unit removed from the main frame; and

Figure 6 is a detail sectional view on the line 6—6 of Figure 2 illustrating a manner of securing the ends of the tie bars to the side frame members.

In the selected embodiment of the invention here shown, there is illustrated in Figures 1 and 2, a lawn mower comprising a main frame including spaced-apart frame members 2 and 3, the former having a hub 4 bored to receive a suitable bearing sleeve 5, as shown at the left hand side of Figure 1. A drive wheel 6 is shown provided with a hub 7 adapted to be rotatably mounted in the bearing sleeve 5, and the hub 7 of the other drive wheel 8 is mounted in a similar bearing sleeve 5 supported in a hub 9, provided on the frame member 3. The bearing sleeves 5 are non-rotatably secured in their respective hubs by suitable means such as a press fit.

A shaft 10 is rotatably mounted in the hubs 7 of the drive wheels 6 and 8, and has a reduced portion 11, preferably squared, upon which a gear 12 is secured by such means as a nut 13, received in threaded engagement with the shaft terminal. The shaft 10 is driven by suitable clutches 14, each including a flanged disk 15 secured to the shaft 10 by such means as set screws 16, and having a plurality of notches 17 provided upon the inner faces of their flanges 18, as indicated by the dotted lines in Figure 2. A plurality of dogs 19 are movably supported in suitable sockets 21 provided in the faces of the hubs 7 of the drive wheels, adapted to engage the notches 17 in the disks 15, as will readily be understood by reference to Figure 2. The notches 17 and dogs 19 thus provide a driving connection between the drive wheels and shaft 10, when the lawn mower is traveling in a forward direction. When the mower is moved backwardly, the clutches 14 operate as ratchets and impart no movement to the shaft 10.

The mower is provided with the usual reel 22 and cooperating cutter blade 23, and these parts are arranged and united into a suitable unitary structure, hereinafter designated as a reel unit whereby these parts are retained in operative relation independent of the main frame.

In the construction shown in the drawings (see particularly Figure 5), the reel 22 is secured to a supporting shaft 24, and this shaft is supported by suitable bearings in the arms 27 and 28, which in turn have trunnions 32 by which the reel unit is supported in the side members 2 and 3 of the main frame (see also Figure 1). The reel shaft is readily operated by any suitable driving means carried on the main frame, even though there may be pivotal movement between the reel unit and the side members of the main frame.

As here shown, the cutter blade supporting bar 36, is secured at its ends to inwardly turned portions 33 provided at the lower ends of the arms 27 and 28; and the opposite ends of these arms support the reel supporting shaft 24, preferably by suitable anti-friction bearings 29, each provided with a dust cap 31. The cutter blade 23 is suitably secured in fixed relation to the supporting bar 36. By this means the reel 22, its supporting shaft 24, the cutter blade supporting bar 36, the cutter blade 23, carried thereby, and the arms 27 and 28 are united and arranged to form a unitary structure or reel unit independent of the main frame of the machine.

The cutter blade supporting bar 36 is adjustably secured to the end portions 33 of the arms 27 and 28 whereby the blade 23 may be adjusted with respect to the reel 22. The end portions 33 of the arms 27 and 28 are each provided with a pair of adjusting screws 34 and 35, as shown in Figure 3. These adjusting screws have their threaded terminals received in correspondingly threaded sockets provided in the cutter blade supporting bar 36. A pivot stud 37 is adjustably secured in each arm portion 33, and each has its lower end received in a suitable depression 20 provided in the blade supporting bar 36, as shown in Figure 3. The cutting edge 38 of the blade 23 may be adjusted with respect to the reel as shown by the dotted line positions A and B, by rotation of the adjusting screws 34 and 35. By rotating the pivot studs 37, the cutter blade supporting bar 36 may be bodily adjusted to the desired distance from the reel. It will thus be seen that by the provision of the adjusting means herein disclosed, the cutter blade may be accurately adjusted with respect to the reel so as to obtain a perfect cutting relation between the edge 38 of the blade 23 and the several blades of the reel.

Another feature of the invention resides in the connections provided between the cutter blade supporting bar 36 and the portions 33 of the arms 27 and 28. Referring to Figures 3 and 4, it will be noted that each portion 33 is provided with an elongated recess 39 adapted to receive a correspondingly shaped portion 41 provided at each end of the cutter bar 36. The portions 41 are shaped to snugly fit in the recesses 39 so that when the reel unit is removed from the main frame, as illustrated in Figure 5, the cutter blade 23 may be accurately adjusted with respect to the blades of the reel without throwing the unit out of alinement. This is an important feature in that it maintains the parts of the reel in alignment even when the adjusting screws are loosened.

When the reel unit is assembled in the main frame, as shown in Figures 1 and 2, the cutter blade 23 may be adjusted with respect to the reel in the usual manner.

The side frame members 2 and 3 of the main frame are here shown connected together by means of tie rods 42 and 43. The upper tie rod 42 is preferably tubular, and has its terminals internally threaded to receive a pair of flanged studs 42a. These studs are received in hubs 44 provided in the side frame members, as best shown in Figure 6. Each stud 42a has a projecting terminal 30 adapted to be engaged by the usual handle of the mower, not shown.

The lower tie rod 43 is here shown solid in cross-section, and has its ends reduced and received in apertures 45, provided in the rear portions of the frame members 2 and 3, as shown in Figure 4. Suitable cap screws 40 are received in threaded engagement with the ends of the rod 43 to rigidly secure the rod to the frame members 2 and 3. It will thus be seen that the tie rods 42 and 43 cooperate with the frame members 2 and 3 to provide a rigid main supporting frame for the reel unit and the parts associated therewith.

The driving connection between the drive shaft 10 and the reel supporting shaft 24 is here shown consisting of a train of gears including the aforesaid gear 12, which meshes with a pinion 46 secured to a relatively larger gear 47, which, in turn, meshes with a pinion 48 removably secured to the end portion 25 of the reel shaft 24. The pinion 48 is held against relative rotation upon the shaft portion 25 by a suitable key 49. (See Figure 1.) The gears 46 and 47 are shown mounted upon a suitable anti-friction bearing 51, supported upon a pin or stud 52 secured to the frame member 2 of the main frame, as best shown at the left hand side of Figure 1. A cover plate 53 cooperates with the frame member 2 to provide a casing adapted to enclose the train of gears, above described, and whereby said gears may operate in a suitable lubricant.

Another feature of the invention resides in the three-point suspension for supporting the reel and cutter blade unit in the main frame of the mower. To thus support the reel unit in the mower frame, the cutter blade supporting bar 36 is provided intermediately of its ends with a pair of spaced lugs 54 and 55, adapted to engage the lower tie rod 43, as shown in Figures 1, 2, and 4. These lugs preferably have their adjacent faces convexed as best shown in Figure 4, so that the main frame of the mower may relatively yield or twist without causing the rod 43 to bind between the lugs 54 and 55. The broken lines a—a and b—b in Figure 4 illustrate how the tie rod 43 as a member of the main frame may relatively deflect in a direction transversely thereof, without transmitting the twisting strains imparted to the main frame, on to the reel unit.

It will be seen, by reference to Figure 1, that the means which support the reel unit within the main frame, including the pivotal connections of the arm extensions 32 with the side frame members 2 and 3, and the connection of the cutter blade supporting bar 36 with the tie rod 43, by means of the spaced lugs 54 and 55, provide, in effect, a three-point suspension for the reel unit, which, as hereinbefore stated, will permit yielding and twisting of the main frame without affecting the relative position of the reel and cutter blade.

The rear portion of the machine frame is shown supported upon the usual roller 56 adjustably secured to the rear end portions 57 of the side frame members 2 and 3, by means of slotted brackets 58 and adjusting screws 59.

The novel mower featured in this invention is so constructed that it may be readily disassembled without disturbing the adjustment of the reel and cutter blade. To remove the reel unit from the main frame, the side member 3 of the frame is detached from the tie rods 42 and 43, by unscrewing one of the studs 42a from the tie rod 42, and releasing the lower rod 43 from the frame member 3 by removal of the cap screw 40. The cap screw 60, secured to the right hand end of the drive shaft 10, is also removed, after which the side frame member 3 may be detached from the main frame and the reel unit removed therefrom. When the reel unit is thus removed from the machine, the shaft extension 25 will become disengaged from the pinion 48, as will be readily understood.

By the employment of this novel construction, the reel unit may be completely assembled and properly adjusted and ground independently of the main frame of the machine.

To assemble the reel unit in the mower frame, the shaft extension 25 is inserted through the aperture or bearing provided in the frame member 2 for the extension 32 on the arm 27, and is engaged with the pinion 48 as shown in Figure 1. Assembling of the reel unit may be facilitated by removal of the cover plate 53 at the left hand side of the machine, whereby convenient access may be had to the pinion 48 and the shaft extension 25. When the left hand side of the reel unit has been assembled in the side frame member 2, the opposite frame member 3 is secured to the tie rods 42 and 43, as will readily be understood by reference to Figure 1, thereby completing the assembling operation.

It will be understood that the above described reel unit flexibly supported at three points, one point concentric with the reel bearing on each side of the main frame and one intermediate point on a transverse member of the main frame, is equally adapted to various lawn movers having diverse types of reel driving means, since the reel bearings are fixed in the main frame. In this manner the principal feature of this invention resides in the three-point flexible mounting upon the reel center in combination with the unitary character of the reel unit assembly which includes knife adjusting means independent from any strain or distortion which may occur in the main frame. This independent relationship of the knife and adjustment from the frame is of vital importance in maintaining the knives of a lawn mower in sufficiently close adjustment to always cut the grass perfectly while running freely out of actual contact, irrespective of rough handling which the mower may receive in regular use. By this means the mower not only maintains its adjustment over long periods of operation, but the cutting edges of the knives are maintained in proper sharpened condition without actual rubbing, this greatly contributing to easy running of the mower.

I claim as my invention:

1. A lawn mower comprising a main frame with side members, suitable wheels for supporting the same, reel driving means supported on said frame, and a reel unit comprising a pair of arms, a cutting reel journaled between said arms, and a knife carried by said arms in cutting relation with respect to said cutting reel, said reel unit being flexibly connected to the main frame at a point substantially on the longitudinal center line of the same, and said reel unit being further pivotally connected to each of the side members of said main frame at points substantially coincident with the axis of the cutting reel, whereby deflections of the main frame are not transmitted to said cutting reel unit and a precise cutting relationship between the knife and reel in said unit may be maintained irrespective of main frame deflections.

2. A lawn mower comprising a main frame having side members, suitable wheels, reel driving means supported on said main frame, and a reel unit comprising a pair of arms, a cutting reel journaled between said arms, and a knife connected to said arms and carried thereby in cutting relation with respect to said reel, said unit being flexibly supported in said main frame at three points and in such position that the cutting reel and knife are located transversely with respect to the direction of travel, two of said points of support comprising pivot connections between the said arms and the side members of said main frame and the third of said points comprising a rear flexible connection to the main frame substantially on the longitudinal center line thereof and below the path of the clippings discharged by the cutting reel, whereby distortions of the main frame are not transmitted to said cutting reel unit so that a precise cutting relationship between the knife and reel in said unit may be maintained, irrespectve of main frame deflections.

3. In a lawn mower having supporting wheels, a main frame, and reel driving means, a reel unit including a cutting reel, and a knife supported in cutting relation with said reel, said reel unit being flexibly connected to said main frame at three points and being free of the main frame at all other points, thereby to permit deflections of said frame without causing distortion of said reel unit with consequent disturbance of the precise cutting relationship of said knife and reel, and two of said points of connection being substantially coincident with the axis of the cutting reel.

4. A lawn mower comprising a main frame with side members, suitable wheels for supporting the same, reel driving means supported on said frame, and a reel unit comprising a pair of arms, a cutting reel journaled between said arms, and a knife carried by said arms in cutting relation with respect to said cutting reel, said reel unit being flexibly connected to the main frame at a point substantially on the longitudinal center line of the same and said reel unit being further pivotally connected to each of the side members of said main frame at one point for pivotal movement about an axis coincident with that of the cutting reel, whereby distortions of the main frame are not transmitted to said cutting reel unit and a precise cutting relationship between the knife and reel in said unit may be maintained irrespective of main frame deflections.

5. A lawn mower comprising a main frame having side members, rolling elements for supporting said frame, reel driving means supported on said main frame, and a reel unit comprising a pair of arms, a cutting reel journaled between said arms, a knife connected to said arms and carried thereby in cutting relation with respect to said reel, and means on the reel unit for adjusting the reel and knife relatively to each other, said unit being completely supported by said main frame and flexibly connected thereto at three points and being located in such position that the cutting reel and knife are located transversely with respect to the direction of travel, two of said points of connection comprising pivot connections between the said arms and the side members of said frame and the third of said points comprising a rear flexible connection to the main frame substantially on the longitudinal center line thereto, whereby distortions of the main frame are not transmitted to said cutting reel unit so that a precise cutting relationship between the knife and reel in said unit may be maintained, irrespective of main frame deflections.

JOHN S. CLAPPER.